United States Patent [19]

Farling et al.

[11] Patent Number: 5,760,876
[45] Date of Patent: Jun. 2, 1998

[54] MONITORING OF MAGNETICALLY RECORDED DATA ON FILM IN PHOTOFINISHING AND FILM SCANNING EQUIPMENT

[75] Inventors: Duane James Farling, Webster; Christopher Thomas Mattson, Rochester, both of N.Y.

[73] Assignee: Eastman Kodak Company, Rochester, N.Y.

[21] Appl. No.: 662,566

[22] Filed: Jun. 11, 1996

[51] Int. Cl.$^6$ .................................................. G03B 27/52
[52] U.S. Cl. ........................... 355/40; 396/319; 360/71; 355/41
[58] Field of Search ........................ 396/311, 319; 355/40, 41, 77; 360/69, 71, 128, 137; 369/71, 72

[56] References Cited

U.S. PATENT DOCUMENTS 5,204,708  4/1993  Whitfield et al. ................... 396/319
5,461,454  10/1995  DeMarti, Jr. et al. ................ 355/41
5,495,371  2/1996  Munemoto et al. .................. 360/71

*Primary Examiner*—D. Rutledge
*Attorney, Agent, or Firm*—Francis H. Boos, Jr.

[57] ABSTRACT

In photographic equipment for reading magnetically recorded data on a film strip, gradual degradation of the read data signal caused, for example, by material buildup on the magnetic read head is detected by monitoring the read data signal to indicate when the signal falls below a normal signal level but is still above a minimum threshold at which data loss would result. Apparatus useful for this purpose includes first and second comparators for sensing the decline of the data signal level into a range falling between a first predetermined normal signal level threshold and a second lower predetermined signal level preferably at or slightly above minimum detectable signal level. With such an arrangement, even though data is still capable of being read and decoded, the operator of the data read equipment is given advance warning of the incipient read data problem sufficiently in advance of read failure condition to allow corrective action, e.g. cleaning of the read head, before actual data read failures occur.

6 Claims, 2 Drawing Sheets

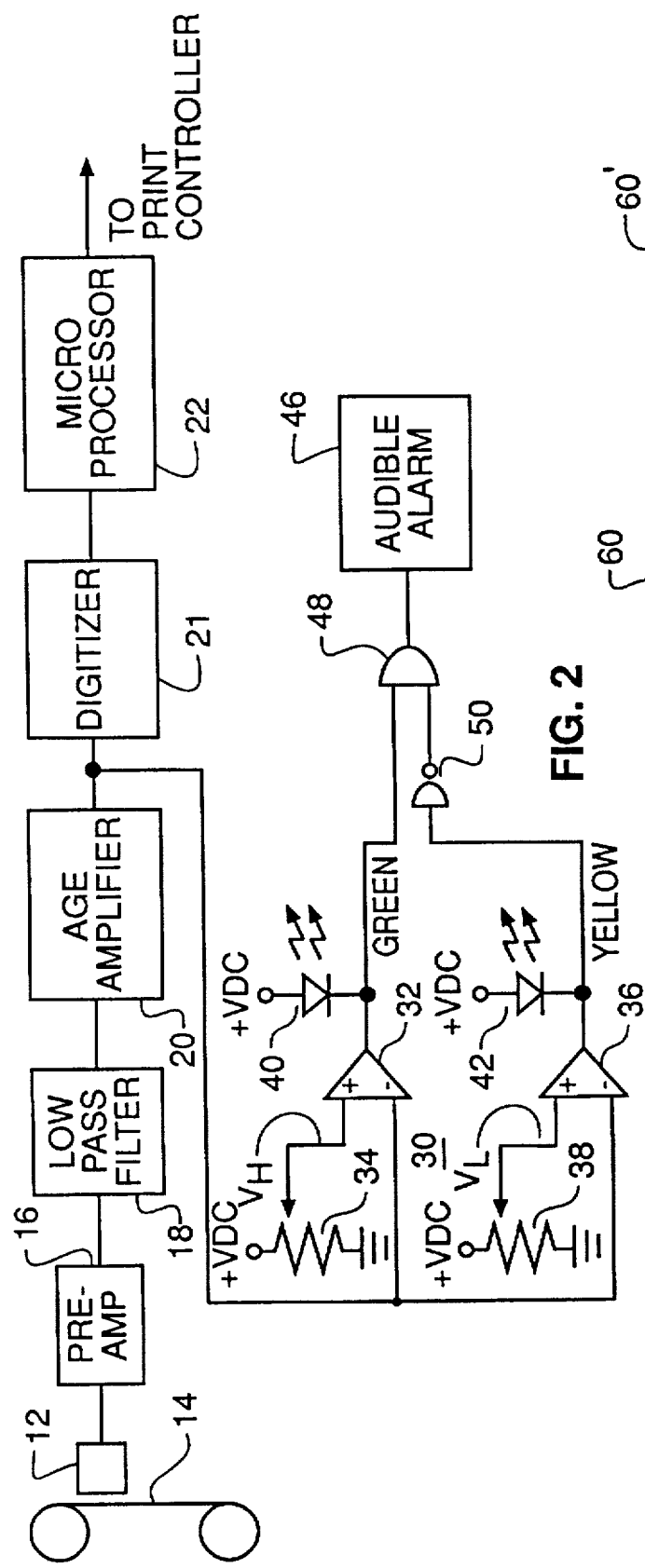
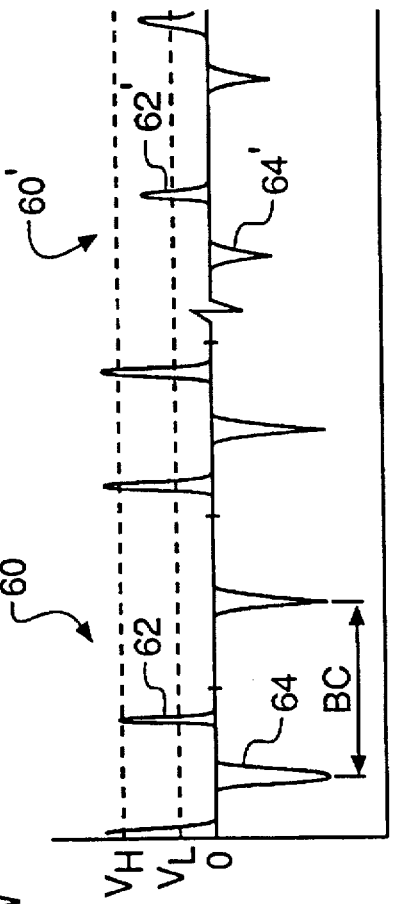
FIG. 2
FIG. 3

MONITORING OF MAGNETICALLY RECORDED DATA ON FILM IN PHOTOFINISHING AND FILM SCANNING EQUIPMENT

FIELD OF THE INVENTION

The invention relates to the field of reading magnetic data recorded on photographic film and more specifically to apparatus and methods for monitoring of film magnetic recorded data in photofinishing and film scanning equipment.

BACKGROUND OF THE INVENTION

A recently introduced photographic system employs a magnetic layer coated on photographic film for recording of data which serves as a mechanism for information exchange between successive stages of the photographic process as, for example, from the camera user to the photofinisher. The data is read by a magnetic read head and associated electronics typically included in a film scanner located at the front end of a photographic printer at the photofinishing lab. The reliability of reading previously recorded magnetic signals from processed photographic film may be jeopardized by many variables in the film manufacturing and utilization process that can cause buildup of material on the magnetic read head. Some of the identified sources of variability that can result in the build-up of material on the read head include the types of film processing chemicals, local water conductivity, film processor design, film dryer design, processing chemical replenishment rates and film processor maintenance and cleanliness. Over time, as material builds up on the read head, the ability to detect the magnetic data signal is degraded resulting in loss of data in the information exchange process.

The new photographic system is dependent upon the reliable reading during photofinishing of this magnetically recorded data to deliver many customer features, such as print aspect ratio and orientation, printing of recorded text on the prints, and print quality improvement in photoprocessing using exposure data automatically recorded by the camera during picture taking events. Typically, the magnetic read capability of the photoprinter's scanner is checked periodically, such as at the beginning of a day's operation, by running a calibrated strip of film with recorded data through the scanner to verify operation of the data reading circuitry. However, undetected accumulations of foreign material on the read head during the course of a day's operation can result in failure to deliver customer features on numerous orders unless and until the problem is discovered during periodic visual print inspections. The problem is aggravated by the fact that the optical print processing continues in seemingly normal manner even though the data is not being read properly and the absence of the features called for by the recorded data is thus not immediately apparent. Moreover, since the film orders with magnetic data can be interspersed on film reels with conventional, non-data-recorded film orders, it becomes difficult to determine from visual inspections whether printing of the data recorded film is progressing properly. The problem can be particularly notorious in commercial photolabs, employing high speed printers operating at the rate of 4–7 frames per second, wherein only a relatively few minutes of improper operation can result in numerous orders requiring costly makeover reprinting to get the orders printed properly. There is therefore a need for apparatus and methods for monitoring of the data reading process to detect the onset of the material buildup on the magnetic read head to allow an operator to take corrective action before it results in the actual loss of data.

SUMMARY OF THE INVENTION

In accordance with the invention, therefore, there is provided film image reproducing apparatus for reproducing images from image frames formed on successive processed photographic film strips, at least some of the film strips having data recorded in a magnetic layer formed thereon. The apparatus comprises magnetic read means for scanning processed photographic film to develop output data signals representative of the data recorded in the film magnetic layer; print means for reproducing the film image frames on an image medium; and means for utilizing the output data signals to effect control of a processing operation associated with reproduction of the image frame on the image medium. The image reproducing apparatus also includes output data signal monitoring means for indicating to an operator of the print means when the output data signal is in a degraded signal range, the range being below a normal signal level yet still above a level at which actual loss of the output data signal occurs, thereby allowing the operator to take corrective action to improve operation of the magnetic read means.

In accordance with a particular feature of the invention apparatus is provided for detecting signal level of film magnetic recorded data to provide advance indication of signal degradation caused by material buildup on a magnetic read head. The apparatus comprises means for supplying a data pulse signal detected from film magnetic recorded data; first means for generating a first signal representative of data pulse signals exceeding a first predetermined threshold value and second means for generating a second signal representative of data pulse signals exceeding a second predetermined threshold value lower than the first threshold. The apparatus also includes indicator means responsive to occurrence of the first and second signals for providing an indication of normal signal detection and to occurrence of only the second signal for providing an indication of degraded signal detection; whereby an operator is warned by the indication of degraded signal detection to take corrective action to restore normal signal detection.

In accordance with another aspect of the invention a method of detecting signal level of film magnetic recorded data to provide advance indication of signal degradation caused by material buildup on a magnetic read head is provided which comprises the steps of supplying a data pulse signal detected from film magnetic recorded data; generating a first signal representative of data pulse signals exceeding a first predetermined threshold value; and generating a second signal representative of data pulse signals exceeding a second predetermined threshold value lower than the first threshold. The method further includes the step of responding to occurrence of the first and second signals to provide an indication of normal signal detection and to occurrence of only the second signal to provide an indication of degraded signal detection, whereby an operator is warned by the indication of degraded signal detection to take corrective action to restore normal signal detection.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the drawings:

FIG. 2 is a partially schematic block diagram of apparatus for detecting the onset of data loss caused by clogging of a film magnetic read head; and FIG. 3 is a signal diagram useful in explaining the operation of the arrangement of FIG. 2.

DETAILED DESCRIPTION OF THE INVENTION

Figure 1:
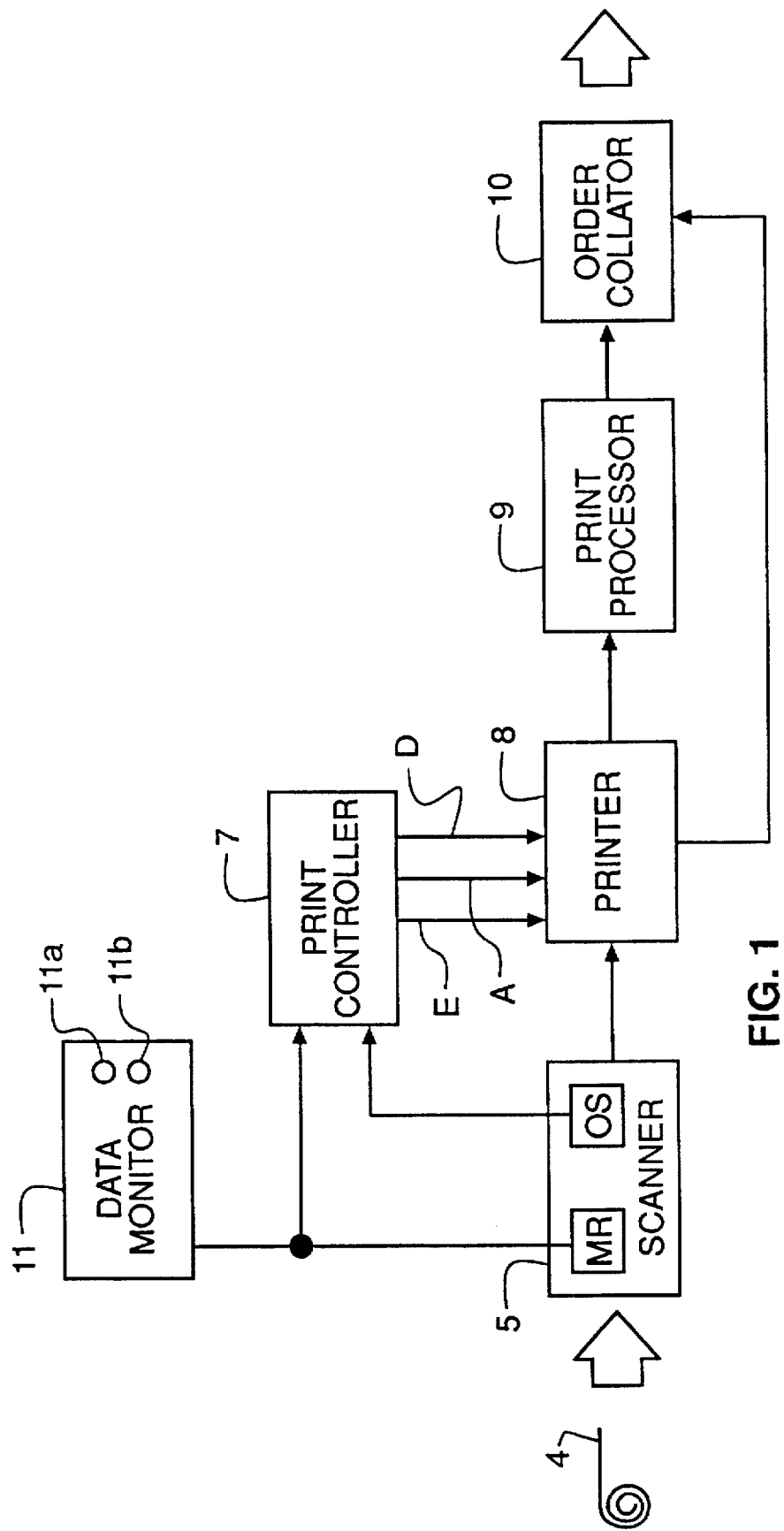
FIG. 1 is a functional block diagram of image reproducing apparatus embodying the present invention.

In FIG. 1, a generalized block diagram of a photographic film printer and order collator is shown. Reference 4 represents a reel of spliced together film strips, each strip corresponding to a film order. The film 4 is fed through a scanner 5 which includes an optical scanner OS and a magnetic read head and associated electronics MR. The optical scanner generates image pixel data which is applied to a microprocessor in print controller 7 where appropriate exposure control data is generated in known manner. If the film strip being scanned is of the type having magnetically recorded data thereon, the data is read by read head MR and stored in memory in the microprocessor of print controller 7. After scanning, film 4 is fed to the printer 8 where the image frames on the film are optically exposed to print paper. The exposure parameters are set determined by exposure correction information on line E derived, in the case of conventional, non-magnetically recorded film, from the optically scanned image pixel data from scanner OS. If the film contains magnetically recorded data, the exposure correction information on line E may be derived from the print quality improvement data read from the film, e.g. scene illuminant type, flash/no-flash, etc.. Additionally, customer preferences such as print aspect ratio and image orientation may be provided on line A and text data to be applied to the print may be provided on line D. After exposure, the print paper is fed to print processor 9, where the paper is developed and cut into individual prints. The prints are then sent to order collator 10 where the prints are place with the original film into the order bag for return to the customer.

As is apparent from the foregoing description, the proper operation of printer 8 in the case of film with magnetically recorded data thereon, assumes that such data will be detected and available at the outputs of print controller 7. If for any reason, such as build-up of material on the magnetic read head, the data is not read or is incorrectly read, the printing process will proceed without the benefit of the adjustments represented by the data on the film. Only vigilant attention to the print results during visual inspections after processing and before the collator will detect incorrect printing operations and then only after numerous orders have been processed. Also, the fact that data recorded film and conventional film orders are interspersed makes it even harder to spot the onset of data loss in the scanner printer operation. For this reason, and in accordance with the invention, a data monitor 11 is provided which functions to monitor the quality of the data signals read and sent to the print controller to sense the onset of degraded signal conditions before they reach the stage at which actual loss or incorrect decoding of signals occurs. The monitor is provided with means, such as lights 11a or audible buzzer 11b, to indicate this onset of degraded signal condition to the operator of the scanning printing equipment thereby allowing the operator to take corrective action, as by cleaning of the magnetic read head MR, before signal corruption or loss actually occurs and adversely affects the image reproduction process in the printer.

Referring now to FIG. 2, a presently preferred embodiment of a signal detection apparatus useful as the data monitor 11 is shown. A magnetic read head 12 is positioned over magnetic layer formed on the backside of a processed photographic film 14 to read data recorded on the film, typically having been recorded by camera data recording apparatus. The signal detected by the read head is initially amplified in a preamplifier 16, passed through a filter 18 to remove high frequency noise and applied to an automatic gain control amplifier 20. The amplified signal is then applied to a digitizer 21 for conversion from an analog pulse signal to digital data which is then applied to microprocessor 22 where the digital data is stored for subsequent use during production of prints from the images on the film.

In accordance with the invention, apparatus 30 for detecting signal level of film magnetic recorded data to provide advance indication of signal degradation caused by material buildup on magnetic read head 12 includes a comparator 32 having a positive input side coupled to a variable resistor 34 set to establish a first predetermined threshold $V_H$ and a second comparator 36 having a positive input side coupled to variable resistor 38 set to establish a second predetermined threshold $V_L$ which is lower than threshold $V_H$. The data pulse signal output from AGC amplifier 20 is coupled to the negative input sides of each of comparators 32 and 36. The outputs of the comparators 32 and 36 are coupled respectively to a green LED 40 and a yellow LED 42. The LED's 40 and 42 serve as indicator means responsive to simultaneous occurrence of output signals from comparators 32 and 36 to provide an indication of normal signal detection and to occurrence of only the signal from comparator 36 to provide an indication of degraded signal degradation such as would be caused by buildup of material on the magnetic read head 12.

An audible indication of the occurrence of a low level detected signal indicating degraded signal detection is provided by an audible alarm 46 which may be a buzzer or similar device. For this purpose, alarm 46 is coupled to the output of AND circuit 48 which has one input directly coupled to the output of comparator 32 and the other input coupled via an inverter 50 to the output of comparator 36.

The operation of the apparatus of FIG. 2 will be described with reference to the signal diagram of FIG. 3. In FIG. 3, reference numeral 60 indicates a normal level data pulse train at the output of AGC amplifier 20 in which pulses 62 represent the pulse position modulated data and pulses 64 represent the clock pulses defining bit cells BC. Assuming the existence of a clean read head free of material buildup on the magnetic read gap, the peak amplitude of the detected data pulse signal will fall within an expected range that exceeds a threshold $V_H$. When applied from amplifier 20 to the negative input side of comparator 32, the output from comparator 32 causes LED 40 to generate a green output light indicating that signals are being properly detected from the film magnetic layer. Simultaneously, the data pulse signal applied to the negative input side of comparator 36 exceed the lower threshold setting $V_L$ thereby activating the yellow LED 42. The lowgoing output of comparator 32 applied to AND circuit 48 inhibits the operation of the audible alarm 46.

In the event of buildup of material on read head 12, the peak signal level will drop and at some point will drop below the AGC control range of amplifier 20. As a consequence, the signal at the output of amplifier 20 will fall as shown at 60' such that the data pulses 62', and similarly clock pulses 64', are within, i.e. below, threshold $V_H$, although still outside, i.e. higher than threshold $V_L$. When this occurs, the lowgoing output of comparator 36 causes yellow LED 42 to continue being activated while the green LED 40 is now extinguished. This visual indication warns the operator that signal level are falling and corrective action is needed to clean the magnetic read head. Additionally, the output of comparator 36 is inverted to provide a high input to AND circuit 48 which combines with the high output (absence of signal) from comparator 32 to activate audible alarm 46. During the intervals between pulses, the normally high output of comparator 36, inverted by inverter 50, holds the audible alarm in the off condition. In the case of a film strip on which no signal is recorded, both LED's will remain extinguished and the audible alarm remains inactivated. Preferably, threshold $V_L$ is set by variable resistor 38 to be slightly above background noise level such as might be generated by attempting to read a film strip with no magnetic recorded data on the film strip.

There has thus been described a simple and effective method and apparatus for providing advance warning to an operator of photographic film data reading equipment that an incipient problem with reading of magnetically recorded data on the film is beginning to occur well in advance of actual loss of data reading ability and in time for the operator to perform necessary corrective action.

The invention has been described with reference to a preferred embodiment. However, it will be appreciated that other variations and modifications can be effected by a person of ordinary skill in the art without departing from the scope of the invention. For example, visual indication may be provided by means of a single indicator lamp in place of the audible alarm device thereby eliminating the need for dual indicator LED's 40 and 42.

Parts List 12 magnetic read head
14 photographic film
16 preamplifier
18 filter
20 ACG amplifier
21 digitizer
22 microprocessor
30 read head clog detection apparatus
32 comparator
34 variable resistor
36 comparator
38 variable resistor
40 green LED
42 yellow LED
46 audible alarm
48 AND circuit
50 inverter
60 normal level data pulse train
60' degraded data signal
62 PPM data signal
62' degraded PPM data signal
64 clock pulses
64' degraded clock pulses
$V_H$ minimum normal signal level threshold
$V_L$ lower signal level threshold

What is claimed is:

1. Film image reproducing apparatus for reproducing images from image frames formed on successive processed photographic film strips, at least some of the film strips having data recorded in a magnetic layer formed thereon; the apparatus comprising:

magnetic read means for scanning processed photographic film to develop output data signals representative of said data recorded in the film magnetic layer;

print means for reproducing said film image frames on an image medium;

means for utilizing said output data signals to effect control of a processing operation associated with reproduction of the image frame on the image medium; and output data signal level monitoring means for indicating to an operator of said print means when said output data signal level is in a degraded signal level range, said range being below a normal signal level yet still above a level at which actual loss of said output data signal occurs, thereby allowing the operator to take corrective action to improve operation of said magnetic read means, said monitoring means being additionally operative to indicate the absence of any data signal on the film strip.

2. Film image reproducing apparatus according to claim 1 wherein said monitoring means includes an audible alarm means for providing an audible indication of existence of an output data signal level falling in said degraded signal level range and said audible alarm is activated only by signals in said degraded signal level range and is not activated in the absence of any data signal on the film strip.

3. Apparatus for detecting signal level of film magnetic recorded data to provide advance indication of detected output signal level degradation caused by material buildup on a magnetic read head comprising:

means for supplying a data pulse signal detected from film magnetic recorded data;

first means for generating a first signal representative of data pulse signals exceeding a first predetermined threshold level value;

second means for generating a second signal representative of data pulse signals exceeding a second predetermined threshold level value lower than said first threshold;

indicator means responsive to occurrence of said first and second signals for providing an indication of normal signal level detection and to occurrence of only said second signal for providing an indication of degraded signal level detection;

whereby an operator is warned by said indication of degraded signal level detection to take corrective action to restore normal signal level detection.

4. Apparatus according to claim 3 wherein said indicator means comprises first and second visual indicators each uniquely indicating the presence of data pulse signals exceeding one of said predetermined threshold levels.

5. Apparatus according to claim 3 wherein said indicator means comprises an audible alarm actuated by existence of said second signal in the absence of said first signal.

6. A method of sensing signal level of detected film magnetic recorded data to provide advance indication of signal level degradation caused by material buildup on a magnetic read head in film image reproducing apparatus, the method comprising the steps of:

supplying a data pulse signal detected from film magnetic recorded data;

generating a first signal representative of data pulse signals exceeding a first predetermined threshold level value;

generating a second signal representative of data pulse signals exceeding a second predetermined threshold level value lower than said first threshold; and responding to occurrence of said first and second signals to provide an indication of normal signal level detection and to occurrence of only said second signal to provide an indication of degraded signal level detection;

whereby an operator is warned by the indication of degraded level signal detection to take corrective action to restore normal signal level detection.

* * * * *